L. STEVENS.
Process and Apparatus for Utilizing in Furnaces the Gases from Coking Coal.

No. 221,257. Patented Nov. 4, 1879.

Attest:
Jno. G. Taylor
Eugene A. Mills

Inventor:
Levi Stevens

L. STEVENS.
Process and Apparatus for Utilizing in Furnaces the Gases from Coking Coal.
No. 221,257.                    Patented Nov. 4, 1879.
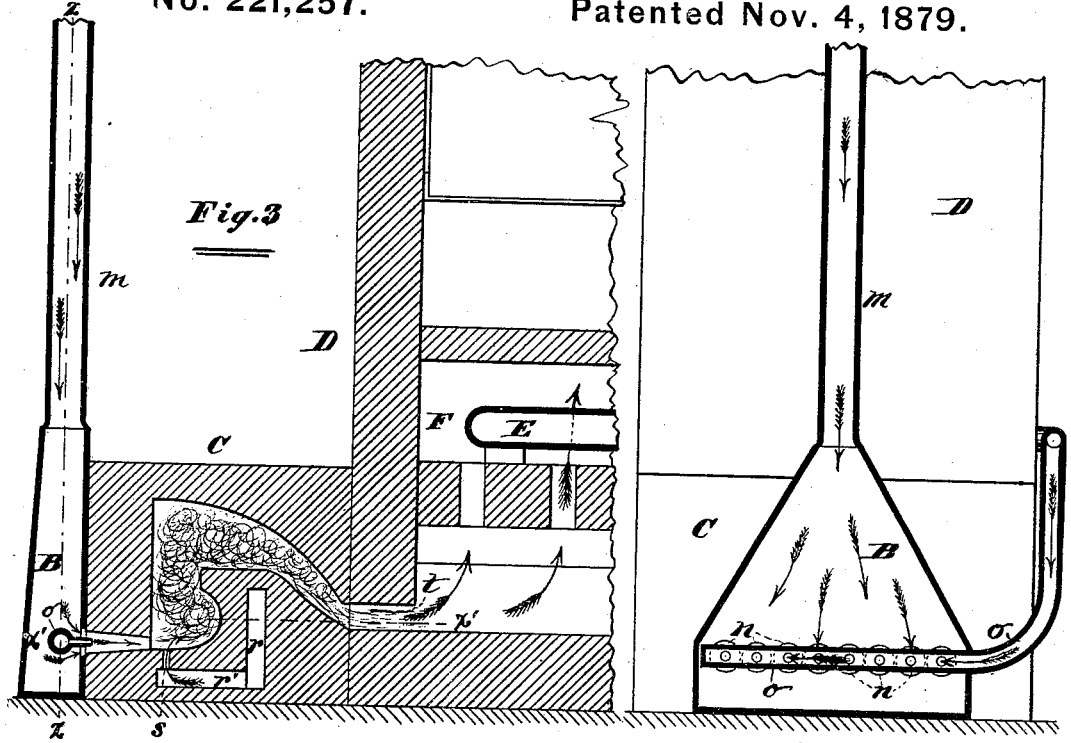
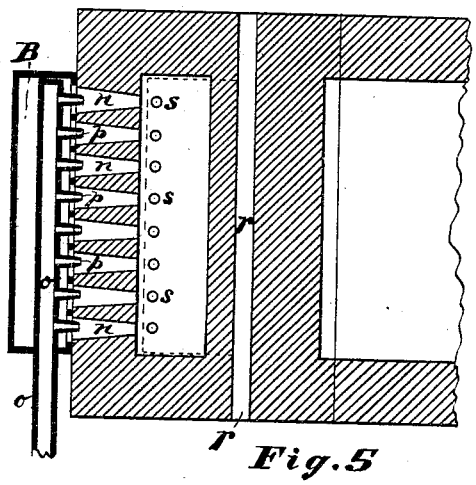
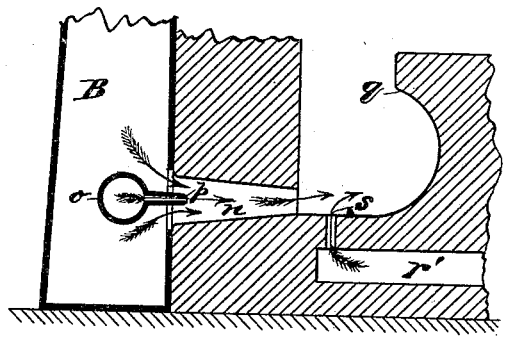
Attest:
Jno. L. Taylor
Eugene A. Mills
Inventor:
Levi Stevens

UNITED STATES PATENT OFFICE.

LEVI STEVENS, OF WASHINGTON, DISTRICT OF COLUMBIA.

IMPROVEMENT IN PROCESSES AND APPARATUS FOR UTILIZING IN FURNACES THE GASES FROM COKING COAL.

Specification forming part of Letters Patent No. 221,257, dated November 4, 1879; application filed April 4, 1879.

*To all whom it may concern:*

Be it known that I, LEVI STEVENS, of Washington, in the District of Columbia, have invented certain new and useful Improvements in Processes and Apparatus for Utilizing in Furnaces the Gases Arising from Coking Coal; and I do hereby declare the following to be a full, clear, and exact description thereof, reference being had to the accompanying drawings, of which—

Figure 1:
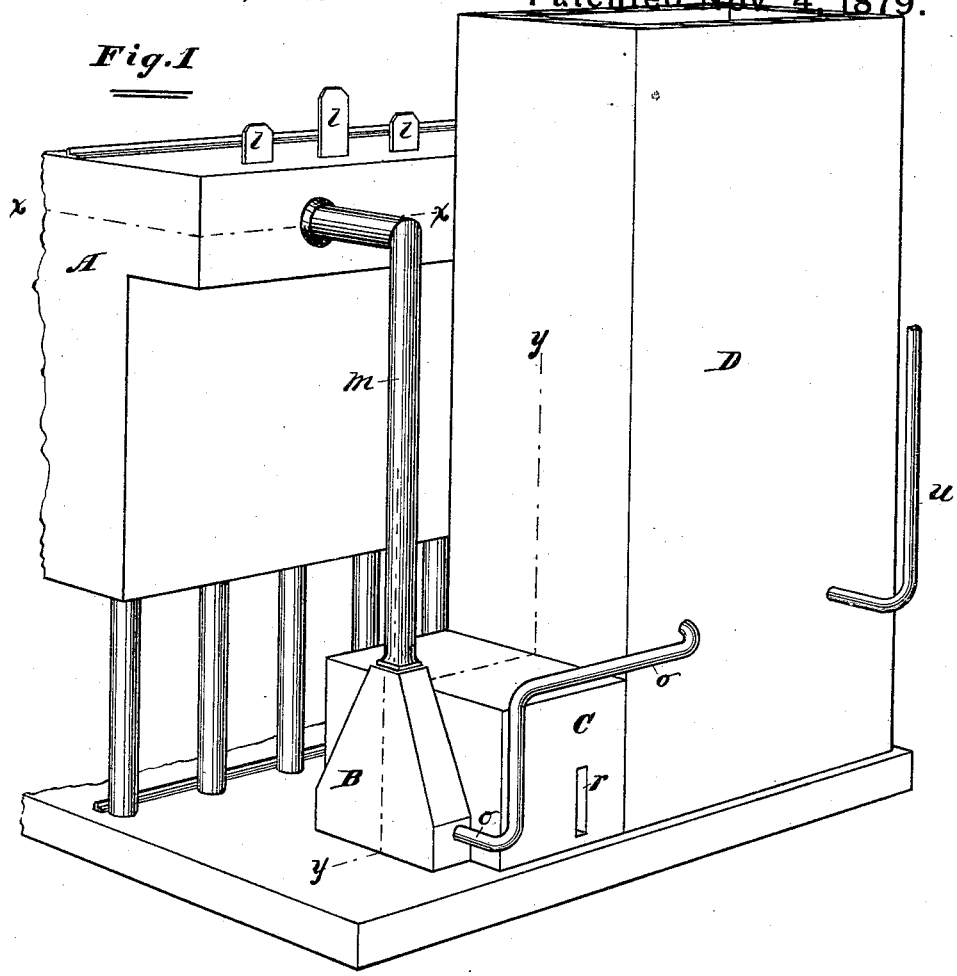
Figure 2:
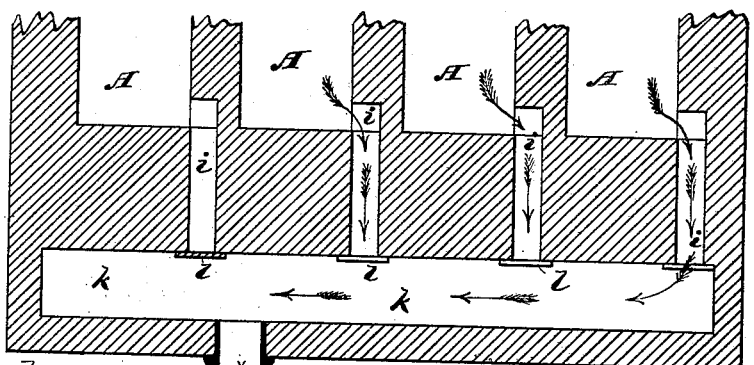

Figure 1 is a perspective view, showing my improved gas-furnace connected to a series of coking-cells, from which its supply of gas is derived, and also to a drier, whereby it is applied to the purpose of drying the coal used in the said coking-cells; Fig. 2, a horizontal section of the coking-cells and escape-flues, taken on the line $x\,x$, Fig. 1; Fig. 3, a vertical central section of the gas-furnace and drier, on the line $y\,y$, Fig. 1; Fig. 4, a vertical section on the line $z\,z$, Fig. 3; Fig. 5, a horizontal section of the furnace on the line $x'\,x'$, Fig. 3; and Fig. 6 an enlarged detail view.

My invention relates to a furnace for consuming the gases generated by coking coal within close chambers, in such manner as to produce very intense heat, which may be applied to a variety of purposes.

I shall describe my furnace in what I deem to be its most important situation—namely, in its relation to the apparatus which I employ for the purpose of carrying into effect my improved process of coking coal, for which Letters Patent of the United States No. 196,714 were granted to me October 30, 1877. In this apparatus it performs the important office of consuming the gases generated within my coking-cells, and of supplying to the drier the heat necessary to dry the coal before it is charged into the cells. Thus the system and economy of the apparatus would obviously be incomplete without it. Nevertheless, it is evident that the supply of gases for its consumption might be derived from chambers wherein coal is coked by other processes than mine, and, moreover, that the resulting heat might be applied to other purposes than that of drying coal, (as for roasting ores, for example;) and I therefore do not limit myself, so far as the independent details of my furnace are concerned, to the precise association shown in the drawings.

My invention consists in utilizing the gases arising from coking coal for fuel in furnaces by conveying the said gases from the cells or chambers wherein the coking is in progress into a chamber adjacent to the furnace, then driving them with great force into the interior of the furnace, and there causing them to encounter atmospheric air, whereby they burst spontaneously into flame and develop great heat, susceptible of application to drying the coal and other purposes.

It further consists in applying the gases arising from coking coal to the purpose of drying the coal, preparatory to coking, by conveying the said gases from the cells or chambers wherein the coking is in progress into a chamber adjacent to a furnace, and then causing them to encounter atmospheric air, whereby they spontaneously ignite, developing products of combustion of great heat, and finally conveying the products of combustion so developed through the drier; and it consists also in various details of construction, all as hereinafter more fully set forth.

In the drawings, A represents the cells, within which coke is formed by my process, above referred to. These cells, which communicate with each other through numerous passages in their walls, and which are discharged and recharged in alternate sets at stated intervals, are each provided with passages $i$ at their upper ends, which lead into a common flue, $k$.

By my process, when in full operation, one-half the cells taken alternately contain material in a stage advanced toward complete conversion into coke, and the remainder contain material undergoing the first half of the process.

The passages $i$ are all provided with dampers $l$, and by means of these only the cells containing material in its later stage of coking are allowed to communicate with the flue $k$, the dampers to the remaining cells being closed.

From the flue $k$ the gases pass by way of the pipe $m$ into the chamber B, situated immediately in front of the furnace C.

A line of conical apertures, n, lead from the chamber B through the front wall of the furnace C into the interior of the said furnace, and a superheated-steam pipe, o, entering the chamber B from without, extends across the interior of the same in line with the apertures n, with small tubes p projecting from it, one into each aperture, thus forming a series of ordinary steam-injectors.

The interior of the furnace is of the reverberatory design, and extending entirely through the bridge-wall from one side of the furnace to the other, and opening at each end to the exterior air is the rectangular passage r. Communicating with this passage, or, more properly speaking, forming a continuation thereof, is the rectangular chamber r', which extends horizontally beneath the bed of the furnace as far forward as the front of the interior.

The length of the chamber is equal to the breadth of the interior of the furnace, as indicated by the dotted lines in Fig. 5.

Close to the forward end of the chamber r', and extending upward through the bed of the furnace, are air-passages s, one in line with each of the conical apertures n.

The operation, therefore, is as follows: The communication between the coking-cells and the chamber B having been opened by means of the dampers, and the steam-jets set in action, the gases are driven with great force into the interior of the furnace through the openings n, and immediately encounter a current of atmospheric air entering from without by way of the passages r r' s, when they burst into flame, burning with extreme violence and developing a heat of very great intensity. The hot products of combustion emanating from the furnace may be utilized for any of the ordinary purposes. In my coking apparatus I admit them by way of a passage, t, into my coal-drier D, through which they pass upward, as through a chimney, encountering in their progress the coal, which is caused to descend gradually by means of sloping shelves projecting from opposite walls of the said drier, such shelves giving to it a zigzag direction, and thus retarding the velocity of its descent. After striking against the under surfaces of the shelves and heating them and passing between and over them, thus acting upon the pulverized coal in every possible situation, and depriving it of every trace of moisture, the products of combustion finally escape through openings in the upper part of the drier to the open air.

In this application of my furnace I locate the superheater E in a chamber, F, by itself, within the drier, and cause all the products of combustion to pass through this chamber in their course to the body of the drier, and thus to impinge against the superheater. Steam is conveyed to the superheater from a generator (not shown) by means of a pipe, u, and passes out by way of the pipe o, before referred to.

What I claim as new, and desire to secure by Letters Patent, is—

1. The method of utilizing the gases arising from coking coal for fuel in furnaces, which consists in conveying said gases from the cells or chambers wherein the coking is in progress into a chamber adjacent to the furnace, then driving them with great force into the interior of the furnace, and there causing them to encounter a current of atmospheric air, whereby they burst spontaneously into flame, and develop great heat, susceptible of application to drying the coal and to other purposes, substantially as specified.

2. The method herein described of applying the gases arising from coking coal to the purpose of drying the coal preparatory to coking, which consists in conveying the said gases from the cells or chambers wherein the coking is in progress into a chamber adjacent to a furnace, then driving them with great force into the interior of the furnace, and there causing them to encounter atmospheric air, whereby they spontaneously ignite, developing products of combustion of great heat, and finally conveying the products of combustion so developed through the drier, substantially as specified.

3. An apparatus for consuming the gases generated by coking coal, consisting of an auxiliary chamber, B, into which the gases from the coking-cells are conveyed by means of a pipe, a series of superheated-steam injectors, o u p, by which the gases are forced from said chamber into the interior of a furnace, and the air-passages r r' s, by means of which air from without the furnace is brought into contact with the injected gases, and in which the superheater, which actuates the steam-injectors, is situated in the line of passage of the hot products of combustion developed by said furnace, substantially as described.

4. In a gas-furnace, C, the rectangular passage r, extending completely through the bridge-wall q, horizontal chamber r', lying beneath the bed of the furnace and forming a lateral continuation of the passage r, and vertical ports s, leading from the chamber r' to the interior of the furnace, in combination with a series of superheated-steam injectors, by which the gases from coking-cells are forced into said furnace, substantially as described, and for the purpose set forth.

LEVI STEVENS.

In presence of—
 JNO. G. TAYLOR,
 EUGENE A. MILLS.